United States Patent [19]

Ohmae et al.

[11] Patent Number: 5,155,159
[45] Date of Patent: Oct. 13, 1992

[54] THERMOPLASTIC ELASTOMER COMPOSITION

[75] Inventors: Tadayuki Ohmae; Yoshiki Toyoshima; Kentaro Mashita; Noboru Yamaguchi, all of Chiba, Japan

[73] Assignee: Sumitomo Chemical Co., Ltd., Osaka, Japan

[21] Appl. No.: 672,985

[22] Filed: Mar. 21, 1991

Related U.S. Application Data

[63] Continuation-in-part of Ser. No. 582,035, Sep. 13, 1990, abandoned.

[30] Foreign Application Priority Data

Sep. 13, 1989 [JP] Japan ................... 1-238175

[51] Int. Cl.$^5$ ................................ C08K 3/10
[52] U.S. Cl. ..................... 524/436; 525/66; 525/179; 525/183
[58] Field of Search ............. 524/436; 525/183, 66, 525/179

[56] References Cited

U.S. PATENT DOCUMENTS

| | | | |
|---|---|---|---|
| 4,343,733 | 8/1982 | Maringer et al. | 524/87 |
| 4,508,640 | 4/1985 | Kanda et al. | 524/441 |
| 4,603,153 | 7/1986 | Sobajima et al. | 524/456 |
| 4,619,962 | 10/1986 | Sato | 524/436 |
| 4,659,785 | 4/1987 | Nagano et al. | 525/324 |
| 4,849,476 | 7/1989 | Mashita et al. | 525/183 |
| 4,863,995 | 9/1989 | Murakami et al. | 525/71 |
| 4,962,148 | 10/1990 | Orikasa et al. | 525/78 |
| 5,010,136 | 4/1991 | Ohmae et al. | 525/183 |

FOREIGN PATENT DOCUMENTS

| | | |
|---|---|---|
| 279578 | 8/1988 | European Pat. Off. |
| 284379 | 9/1988 | European Pat. Off. |

*Primary Examiner*—Paul R. Michl
*Assistant Examiner*—John J. Guamiello
*Attorney, Agent, or Firm*—Sughrue, Mion, Zinn, Macpeak & Seas

[57] ABSTRACT

A thermoplastic elastomer composition having a flexural modulus as defined in JIS K7203-1982 of from 500 to 15,000 kg/cm$^2$, which is obtainable by melt kneading (A) from 20 to 60 parts by weight of a polyamide resin with (B) from 40 to 80 parts by weight of an ethylene copolymer comprising (a) from 40 to 90% by weight of an ethylene unit, (b) from 5 to 60% by weight of an $\alpha,\beta$-unsaturated carboxylic acid alkyl ester unit, and (c) from 0.3 to 10% by weight of a maleic anhydride unit, to obtain a composition (I), and further melt kneading 100 parts by weight of the composition (I) with (C) from 0.01 to 10 parts by weight of magnesium hydroxide having a specific surface area of no more than 20 m$^2$/g as measured by the Brunauer-Emmett-Teller method, is disclosed.

21 Claims, No Drawings

THERMOPLASTIC ELASTOMER COMPOSITION

CROSS REFERENCE TO RELATED APPLICATION

This is a continuation-in-part application of Ser. No. 07/582,035, filed Sep. 13, 1990, now abandoned.

FIELD OF THE INVENTION

This invention relates to a novel thermoplastic elastomer composition which is characteristically flexible and tough over a wide temperature range, has an excellent balance of properties such as mechanical properties and thermal properties as well as a superior appearance, and which is useful for production of automobile bumpers, sound-proof gears, sport shoe soles, tubes, hoses, etc.

BACKGROUND OF THE INVENTION

Soft vinyl chloride-resins, ethylene/vinyl acetate resins, thermoplastic urethane resins, nylon 12, etc. have hitherto been generally used as materials which give hard rubber-like or leather-like shaped articles. They, however, have certain properties which still require improvements, for example, cold resistance in the soft vinyl chloride resins and nylon 12, abrasion resistance in the ethylene/vinyl acetate resins, and formability in the thermoplastic urethane resins. These properties constitute a setback in exploiting their utility.

As described in JP-B-56-22468 (the term "JP-B" as used herein means an "examined Japanese patent publication"), a polyamide-based elastomer having moderate rigidity and flexibility can be obtained by blending a polyamide resin with an ionic ethylene copolymer. This polyamide-based elastomer has relatively improved cold resistance, particularly impact resistance at low temperatures, in addition to the thermal resistance and abrasion resistance which the polyamide resins inherently possess. However, the above-proposed elastomer is not preferable in that the improvements are still insufficient and that it has poor rubber elasticity because of its high rigidity.

On the other hand, as described in JP-A-55-125153 (the term "JP-A" as used herein means an "unexamined published Japanese patent application"), mixtures of polyamide resins and copolymers of ethylene and unsaturated carboxylic acids can be crosslinked by mixing under-heating in the presence of an organic peroxide. However, their impact resistance is still insufficient though it is comparatively improved, and there is a fear of coloration.

JP-A-62-275157 proposes that a thermoplastic resin composition having excellent impact resistance at low temperatures and a well balance between rubber elasticity and rigidity is obtained by melt kneading a polyamide resin with an ethylene/ethyl acrylate/maleic anhydride copolymer, etc.

JP-A-63-146928 describes that a thermoplastic composition having a flexural modulus of from 500 to 15,000 kg/cm$^2$, which is obtained by melt kneading a polyamide resin with an ethylene/ethyl acrylate/maleic anhydride copolymer, etc. and further melt kneading the resulting blend with a polyfunctional compound such as hexamethylenediamine carbamate, has improved impact resistance, enhanced rigidity, and improved heat distortion resistance due to the incorporation of the polyfunctional compound.

Although each of these compositions has a considerably improved balance of properties, a shaped article which has moderate rigidity with a flexural modulus of from 500 to 15,000 kg/cm$^2$ so as to be suited for use as various automotive parts, sport shoe soles, etc. and which shows sufficient impact resistance at low temperatures has not yet been obtained. Thus, further improvements have been required.

SUMMARY OF THE INVENTION

It is an object of this invention to solve these problems by applying a composition containing an ethylene copolymer composed of specific components and to provide a further improved thermoplastic elastomer composition having excellent cold resistance, particularly impact resistance at low temperatures, and an excellent balance between rubber elasticity and rigidity in addition to the excellent thermal resistance, abrasion resistance, and chemical resistance which are characteristics of a polyamide-based elastomer and also having a flexural modulus (as defined in JIS K7203-1982) of from 500 to 15,000 kg/cm$^2$ which is in the range useful from the standpoint of its practical utility.

The present inventors have extensively and elaborately researched and investigated compositions containing an ethylene copolymer which can be effectively blended with a polyamide resin. As a result, it has not been found that by melt kneading a melt kneaded composition containing an ethylene copolymer composed of specific components with magnesium hydroxide, a composition for use in a variety of shaped articles, which has excellent thermal resistance, abrasion resistance, chemical resistance, cold resistance, particularly impact resistance at low temperatures, and an excellent balance between rubber elasticity and rigidity, can be obtained. The present invention has been achieved based on the above finding.

That is, the present invention provides a thermoplastic elastomer composition having a flexural modulus as defined in JIS K7203-1982 of from 500 to 15,000 kg/cm$^2$, which is obtainable by melt kneading (A) from 20 to 60 parts by weight of a polyamide resin with (B) from 40 to 80 parts by weight of an ethylene copolymer comprising (a) from 40 to 90% by weight of an ethylene unit, (b) from 5 to 60% by weight of an α,β-unsaturated carboxylic acid alkyl ester unit, and (c) from 0.3 to 10% by weight of a maleic anhydride unit, to obtain a composition (I), and further melt kneading 100 parts by weight of the composition (I) with (C) from 0.01 to 10 parts by weight of magnesium hydroxide having a specific surface area of no more than 20 m$^2$/g as measured by the Brunauer-Emmett-Teller method (hereinafter abbreviated as "BET method").

The present invention further provides a thermoplastic elastomer composition having a flexural modulus as defined in JIS K7203-1982 of from 500 to 15,000 kg/cm$^2$, which is obtainable by melt kneading (A) from 20 to 60 parts by weight of a polyamide resin with (B) from 40 to 80 parts by weight of an ethylene copolymer comprising (a) from 40 to 90% by weight of an ethylene unit, (b) from 5 to 60% ) unsaturated carboxylic acid alkyl ester unit, and (c) from 0.3 to 10% by weight of a maleic anhydride unit, to obtain a composition (I), and further melt kneading 100 parts by weight of the composition (I) with (C) from 0.01 to 10 parts by weight of magnesium hydroxide having a specific surface area of no more than 20 m$^2$/g as measured by the BET method and (D) from 0.01 to 20 parts by weight of at least one amino group-containing compound containing two or more amino groups per molecule, which is selected from the group consisting of aliphatic diamines, aliphatic diamine carbamates, aliphatic polyamines, alicyclic polyamines, aliphatic polyamines having an aromatic ring, aromatic amines, and tertiary amine compounds.

With respect to the details of the BET method as referred to herein, reference can be made to, for example, *Shokubai*, Vol. 2, No. 4, 473, published by Catalysis Society of Japan (1960).

DETAILED DESCRIPTION OF THE INVENTION

As the polyamide resin which is the component (A) in this invention, various polyamides obtained by polycondensation of lactams having a ring with at least three members, polymerizable ω-amino acids, dibasic acids, and diamines can be used.

Examples of such polyamides include polymers of ε-caprolactam, aminocaproic acid, enantholactam, 7-aminoheptanoic acid, 11-aminoundecanoic acid, etc., and polymers obtained by polycondensation of diamines (such as butanediamine, hexamethylenediamine, nonamethylenediamine, undecamethylenediamine, dodecamethylenediamine, m-xylenediamine, etc.) with dicarboxylic acids (such as terephthalic acid, isophtalic acid, adipic acid, sebacic acid, dodecanedibasic acid, glutaric acid, etc.), and copolymers thereof.

Specific examples of the polyamide resin include aliphatic polyamide resins (such as polyamide 4.6, polyamide 6, polyamide 6.6, polyamide 6.10, polyamide 11, polyamide 12, and polyamide 6.12) and aromatic polyamide resins (such as poly(hexamethylenediamine terephthalamide), poly(hexamethylene isophthalamide), and xylene group-containing polyamides).

Of these, polyamide 6, polyamide 6.6, and polyamide 12 are particularly preferred.

Besides the above, various copolymer nylon resins having a melting point of from 80° to 200° C., which are commercially available for use as hot melt adhesives, can also be employed singly or in combination with polyamides having a melting point of 200° C. or higher.

The ethylene copolymer as the component (B) in the elastomer composition of this invention comprises, as monomer units, (a) from 40 to 90% by weight, preferably from 65 to 90% by weight, of an ethylene unit, (b) from 5 to 60% by weight, preferably from 10 to 35% by weight, of an α,β-unsaturated carboxylic acid alkyl ester unit, and (c) from 0.3 to 10% by weight, preferably from 1 to 5% by weight, of a maleic anhydride unit.

The monomer unit (b), i.e., α,β-unsaturated carboxylic acid alkyl ester unit, is an alkyl ester of an α,β-unsaturated carboxylic acid having from 3 to 8 carbon atoms, such as acrylic acid, methacrylic acid, etc. Examples of the alkyl ester include methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, isobutyl methacrylate, etc. Of these, methyl acrylate, ethyl acrylate, n-butyl acrylate, and methyl methacrylate are particularly preferable.

The ethylene copolymer (B) also includes ethylene copolymers obtained by copolymerizing the above described monomer components with other copolymerizable monomer(s) such as vinyl acetate, vinyl propionate, etc. so far as the performance is not adversely affected.

If the proportion of the ethylene unit (a) in the ethylene copolymer as the component (B) to be employed in the composition of this invention is less than 40% by weight, satisfactory results cannot be obtained with regard to the cold resistance, especially impact resistance at low temperatures, and formability of the composition obtained by formulating the ethylene copolymer with the polyamide resin. If this proportion exceeds 90% by weight, the compatibility with the polyamide resin decreases, resulting in adversely affecting the impact resistance, the appearance of shaped articles, etc.

If the proportion of the α,β-unsaturated carboxylic acid alkyl ester unit (b) in the ethylene copolymer is less than 5% by weight or exceeds 60% by weight, satisfactory results cannot be obtained with regard to the cold resistance, especially impact resistance at low temperatures.

If the proportion of the maleic anhydride unit (c) in the ethylene copolymer is less than 0.3% by weight or exceeds 10% by weight, the cold resistance, especially impact resistance at low temperatures, of the resulting composition is impaired, and moreover, the formability of the composition and the appearance of shaped articles are adversely affected.

The melt index as defined in JIS K6760-1981 of the ethylene copolymer (B) is from 0.1 to 200 g/10 min., preferably from 0.5 to 100 g/10 min. If the melt index is less than 0.1 g/10 min., the formability of the resulting composition and the appearance uniformity of shaped articles are impaired. If it exceeds 200 g/10 min., the mechanical properties of the resulting composition are impaired.

The component (C) used in this invention is magnesium hydroxide, which preferably is such magnesium hydroxide as those described in JP-B-60-57457. Magnesium hydroxide as the component (C) has a specific surface area of no more than 20 m$^2$/g, preferably no more than 10 m$^2$/g, as measured by the BET method. If the specific surface area as measured by the BET method exceeds 20 m$^2$/g, the polarity of the surface of crystal particle is too high so that the crystal particles cause secondary coagulation through the medium of water, whereby dispersion into the resin becomes poor, resulting in adversely affecting the improving effect of impact strength.

The amino group-containing compound containing two or more amino groups per molecule, which is employed as the component (D) in this invention, is selected from the group consisting of aliphatic diamines, aliphatic diamine carbamates, aliphatic polyamines, alicyclic polyamines, aliphatic polyamines having an aromatic ring, aromatic amines, and tertiary amine compounds. This amino group-containing compound is not particularly limited in terms of the molecular weight, and it may be a high molecular weight compound.

Specific examples of the above amino group-containing compound that can be used in this invention are given below.

Examples of the aliphatic diamines include 1,6-hexamethylenediamine, trimethylhexamethylenediamine, dodecamethylenediamine, 1,4-diaminobutane, 1,3-diaminopropane, ethylenediamine, and the like. Examples of the aliphatic diamine carbamates include hexamethylenediamine carbamate, ethylenediamine carbamate, and the like. Examples of the aliphatic polyamines include diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,3-bis(3-aminopropoxy)-2,2-dimethylpropane, 1,3,6-trisaminomethylhexane, iminobispropylamine, methyliminobispropylamine, bis(hexamethylene)triamine, 1,3-bis(γ-aminopropyl)-1,1,3,3-tetramethyldisiloxane, amine-modified silicone oils, polyether diamines, and the like. Examples of the alicyclic polyamines include menthenediamine, N-aminoethylpiperazine, 1,3-diaminocyclohexane, isophoronediamine, bis(4-amino-3-methylcyclohexyl)methane, and the like. Examples of the aliphatic polyamines having an aromatic ring include m-xylylenediamine and the like. Examples of the aromatic amines include diaminodiphenyl ether, 4,4'-methylenedianiline, diaminodiphenyl sulfone, benzidine, 4,4'-bis(o-toluidine), 4,4'-thiodianiline, dianisidine, methylenebis(o-chloroaniline), bis(3,4-diaminophenyl) sulfone, diaminotolyl sulfone, and the like. Examples of the tertiary amine compounds include ethylene copolymers composed of an ethylene unit and an α,β-unsaturated carboxylic acid N,N-dialkylaminoalkyl ester unit, such as a copolymer of ethylene and N,N,N,'N'-tetramethylhexamethylenediamine or N,N-dimethylaminoethyl methacrylate; ethylene copolymers composed of an ethylene unit and an N,N-dialkylaminoalkyl α,β-unsaturated carboxylic acid amide unit, such as a copolymer of ethylene and N,N-dimethylaminopropyl acrylamide; and the like.

In the thermoplastic elastomer composition of this invention, the composition (I) contains from 20 to 60 parts by weight of the polyamide resin, component (A), and from 40 to 80 parts by weight of the ethylene- copolymer, component (B). If the amount of the polyamide resin, component (A), is less than 20 parts by weight, the rigidity and thermal resistance of the resulting composition are insufficient, while if it exceeds 60 parts by weight, the impact resistance of the composition becomes unsatisfactory.

The amount of magnesium hydroxide, component (C), is from 0.01 to 10 parts by weight, preferably from 0.05 to 5 parts by weight, per 100 parts by weight of the composition (I). If the amount is less than 0.01 part by weight, the impact resistance at low temperatures cannot be improved sufficiently, while if it exceeds 10 parts by weight, no further effect can be expected.

The amount of the amino group-containing compound, component (D), is from 0.01 to 20 parts by weight, preferably from 0.05 to 5 parts by weight, per 100 parts by weight of the composition (I). If the amount is below 0.01 part by weight, the thermal resistance and the mechanical properties including rigidity cannot be improved sufficiently, while if it exceeds 20 parts by weight, no further effect can be expected.

The reason why a remarkable improving effect can be produced by the addition of the component (C) or by the addition of the components (C) and (D) in this invention may be considered to reside in that polymers having favorable physical properties can be formed in a micro-dispersed state. It is a quite unpredictable effect that improved impact resistance together and enhanced rigidity as well as improved heat distortion resistance can be brought about. This is because an improvement in the impact resistance usually results in decreased rigidity and impaired heat distortion resistance.

The thermoplastic elastomer composition of this invention may further contain, as other components, additives such as, for example, pigments, dyes, reinforcing agents, fillers, heat stabilizers, antioxidants, weathering stabilizers, nucleating agents, lubricants, antistatic agents, flame retarders, plasticizer, etc., or other polymers, so far as they do not impair the formability and physical properties of the composition.

Incorporation of reinforcing agents or fillers such as surface-treated glass fibers, carbon fibers, talc, calcium carbonate, and the like into the elastomer composition of this invention is particularly advantageous because extremely useful materials having high rigidity as well as high impact strength can be obtained.

The process for preparing the thermoplastic elastomer composition of this invention comprises a process of kneading all the ingredients in the molten state. Illustratively stated, the preparation process comprises melt kneading the polyamide resin (A) with the ethylene copolymer (B) to give a composition (I), and further melt kneading the composition (I) with magnesium hydroxide (C) or with magnesium hydroxide (C) and the amino group-containing compound (D). The above blending order is crucially important, and the object of the present invention cannot be attained with other blending methods such as, for example a method in which components (A), (B), and (C) are melt kneaded together at a time.

Besides the above, master pellets may be prepared beforehand by kneading magnesium hydroxide (C) and the amino group-containing compound (D) with a thermoplastic resin, such as an olefin polymer or a polyamide resin, in the molten state, and then blended with the composition (I) in suitable proportions at the time when producing the thermoplastic elastomer composition of this invention.

Generally employed kneading apparatus such as a Banbury mixer, extruders, rolls, and various kneaders may be used in performing the melt kneading. It is preferred that the resin components in the form of a powder or pellets are uniformly mixed in advance by such a device as a tumbling mixer or a Henschel mixer. If required, however, the mixing may be omitted, and the resin components may be fed in fixed quantities separately to the kneading apparatus.

The kneaded thermoplastic elastomer composition is shaped by injection molding, extrusion molding, or other various shaping techniques. It is also within the scope of this invention to use a method by which without the preikneading step, the components- are dry blended at the time of injection molding or extrusion molding and directly kneaded and shaped during the melting and processing operations to give shaped articles.

In this invention, the flexural modulus as defined in JIS K7203-1982 of shaped articles obtained by shaping the thermoplastic elastomer composition after melt kneading is from 500 to 15,000 kg/cm$^2$.

Since the object of the present invention is to provide a flexible and tough polyamide-based elastomer which is useful in production of, for example, automobile parts such as bumpers, daily necessaries such as sport shoes and work shoes, and mechanical parts such as tubes and hoses, the flexural modulus in the range of from 500 to 15,000 kg/cm$^2$ is suitable for the purpose.

If the flexural modulus is less than 500 kg/cm$^2$, the shaped articles are too soft to attain the object of this invention, whereas flexural moduli exceeding 15,000 kg/cm$^2$ also are not suited for the object of this invention because rigidity becomes too high.

This invention will be explained in more detail by reference to the following examples. It should, however, be understood that this invention is not limited to these examples.

In the examples, the physical properties were measured according to the following methods.

Heat distortion resistance (heat sag) was evaluated by measuring the amount of the deflection generated when a sample held on a cantilever was left to stand in a hot-air oven at 100° C. for 2 hours (shape of sample: 100×20×2$^t$ mm).

Flexural modulus was measured according to JIS K7203-1982 (thickness: 2 mm).

Tensile strength at break and elongation were measured according to JIS K6301-1975 (thickness: 2 mm).

Izod impact strength (V-notched) was measured according to JIS K7110-1984 (thickness: 4 mm, measuring temperature: −40° C.).

Melt index (MI) was measured according to JIS K6760 (190° C., 2160 g).

In the following Examples and Comparative Examples, the following polyamide resin and ethylene copolymer were used as the components (A) and (B), respectively.

(A) Polyamide resin

Polyamide 6, A1022S (manufactured by Unitika, Ltd.)

(B) Ethylene copolymer

The following ethylene copolymer Bondine ® (manufactured by Sumika CdF Chimie Company, Limited.) can be prepared by the methods described in JP-A-61-60708 and JP-A-61-60709.

Bondine ® AX8060: E/EA/MAH=69.9/27.0/3.1 (by weight), MI: 32 g/10 min.

(E: ethylene, EA: ethyl acrylate, MAH: maleic anhydride)

EXAMPLE 1

A master bach was prepared by melt kneading 1 part by weight of magnesium hydroxide (Kisuma ® 5B having a specific surface area of 8 m$^2$/g as measured by the BET method, manufactured by Kyowa Chemical Industry Co., Ltd.) and 9 parts by weight of a copolymer nylon (Grilon ® CF6S manufactured by EMS Co.) at 200° C. by means of a 30 mm$\phi$ single-screw vented extruder.

Using a 30 mm$\phi$ twin-screw vented extruder provided with a side feeder, while melt kneading 45 parts by weight of each of the polyamide resin and ethylene copolymer shown in Table 1 were at 260° C., 10 parts by weight of the master batch was fed in a fix quantity from the side feeder provided in the middle of the extruder barrel. All the ingredients were thus melt kneaded in the extruder to obtain an elastomer composition.

The elastomer composition thus obtained was dried and then molded into test specimens for measurement of physical properties by use of a 10-ounce injection molding machine (Model IS-150-V, manufactured by Toshiba Corporation) at a cylinder temperature of 260° C. and a mold temperature of 70° C.

The heat distortion resistance, flexural modulus, tensile strength and elongation at break, and Izod impact strength of the test specimens were measured, and the results obtained are summarized in Table 1.

EXAMPLES 2 TO 4

Using a 30 mm$\phi$ single-screw vented extruder, master batches were prepared by melt kneading magnesium hydroxide (Kisuma ® 5B having a specific surface are of 8 m$^2$/g as measured by the BET method, manufactured by Kyowa Chemical industry Co., Ltd.), hexamethylenediamine carbamate (HMDAC), and a copolymer nylon (Grilon ® CF6S manufactured by EMS Co.) in the respective proportions shown in Table 1 at 200° C. Elastomer compositions were obtained using the master batches and the physical properties of the compositions were measured in the same manner as in Example 1. The results obtained are shown in Table 1.

EXAMPLE 5

An elastomer composition was prepared and measured for physical properties in the same manner as in Example 4, except that Acryft ® WH303 described below was used in place of the copolymer nylon. The results obtained are shown in Table 1.

Acryft ® WH303: ethylene/methyl methacrylate (82/18 by weight) copolymer resin manufactured by Sumitomo Chemical Company, Limited and having an MI of 7 g/10 min.

COMPARATIVE EXAMPLE 1

Using a 30 mm$\phi$ single-screw vented extruder, a master batch was prepared by melt kneading hexamethylenediamine carbamate and a copolymer nylon (Grilon ® CF6S manufactured by EMS Co.) in the proportion shown in Table 1 at 200° C. A resin composition was obtained using the master batch, and its physical properties were measured in the same manner as in Example 1. The results obtained are shown in Table 1.

The composition obtained above was poor in the impact resistance at low temperatures as compared with those in Examples 2 to 4.

COMPARATIVE EXAMPLE 2

Using a 30 mm$\phi$ twin-screw vented extruder provided with a side feeder, while melt kneading 45 parts by weight of each of the polyamide resin and ethylene copolymer shown in Table 1, 10 parts by weight of a copolymer nylon (Grilon ® CF6S manufactured by EMS Co.) was fed in a fixed quantity from the side feeder provided in the middle of the extruder barrel. All the ingredients were thus melt kneaded in the extruder to obtain a resin composition. The physical properties of this composition were measured in the same manner as in Example 1. The results obtained are shown in Table 1.

The composition obtained above showed poor heat distortion resistance, too low a flexural modulus, and poor impact resistance at low temperatures.

COMPARATIVE EXAMPLE 3

Using a 30 mm$\phi$ single-screw vented extruder, a master batch was prepared by melt kneading hexamethylenediamine carbamate and Acryft ® WH303 in the proportion shown in Table 1 at 200° C. A resin composition was obtained using the master batch, and the physical properties of this composition were measured in the same manner as in Example 1. The results obtained are shown in Table 1. The composition obtained above was poor in the heat distortion resistance and impact resistance at low temperatures.

COMPARATIVE EXAMPLES 4 TO 9

Resin compositions were prepared and measured for physical properties in the same manner as in Example 4, except that each of the compounds shown in Table 1 was used in place of magnesium hydroxide as the component (C).

All the resin compositions obtained above by use of the metal compounds other than magnesium hydroxide showed poor impact resistance at low temperatures as compared with the elastomer composition of Example 4.

amino group-containing compound (D), improved impact resistance and enhanced rigidity as well as improved heat distortion resistance can be obtained.

The novel thermoplastic elastomer composition with good flexibility, which is provided by the present invention, can be easily fabricated into molded articles, sheets, or other shaped articles by molding or shaping techniques used for ordinary polyamide-based elastomers, such as injection molding, extrusion molding, etc. The shaped articles thus obtained have a surprisingly well balance of properties such as thermal resistance, abrasion resistance, flexibility, impact resistance, and chemical resistance and also have excellent appearance uniformity and smoothness.

While the invention has been described in detail and

TABLE 1

| No. | Component (A) (Polyamide resin) (part by weight) | Component (B) (Ethylene copolymer) (part by weight) | Component (C) (part by weight) | Component (D) (part by weight) | Heat distortion resistance (100° C. × 2 hr.) (mm) | Flexural modulus (kg/cm$^2$) | Tensile properties Strength at break (kg/cm$^2$) | Tensile properties Elongation (%) | impact strength (−40° C.) (V-notched) (kg · cm/cm) |
|---|---|---|---|---|---|---|---|---|---|
| Examp. 1 | Polyamide 6, 45 | CF6S 9.0 | Bondine ® AX8060 45 | Mg(OH)$_2$ 1.0 | — | 5 | 4000 | 250 | 300 | 113 |
| Examp. 2 | Polyamide 6, 45 | CF6S 9.4 | Bondine ® AX8060 45 | Mg(OH)$_2$ 0.1 | HMDAC 0.5 | 5 | 3900 | 320 | 210 | 92 |
| Examp. 3 | Polyamide 6, 45 | CF6S 9.0 | Bondine ® AX8060 45 | Mg(OH)$_2$ 0.5 | HMDAC 0.5 | 7 | 3600 | 310 | 230 | 137 |
| Examp. 4 | Polyamide 6, 45 | CF6S 8.5 | Bondine ® AX8060 45 | Mg(OH)$_2$ 1.0 | HMDAC 0.5 | 6 | 3400 | 330 | 240 | 134 |
| Examp. 5 | Polyamide 6, 45 | — | Bondine ® AX8060 45 | Mg(OH)$_2$ 1.0 | HMDAC 0.5 | 6 | 3500 | 320 | 200 | 128 |
| Comp. Examp. 1 | Polyamide 6, 45 | CF6S 9.5 | Bondine ® AX8060 45 | — | HMDAC 0.5 | 5 | 3700 | 310 | 200 | 65 |
| Comp. Examp. 2 | Polyamide 6, 45 | CF6S 10 | Bondine ® AX8060 45 | — | — | 70 | 1000 | 100 | 130 | 55 |
| Comp. Examp. 3 | Polyamide 6, 45 | — | Bondine ® AX8060 45 | — | HMDAC 0.5 | 12 | 3600 | 300 | 180 | 63 |
| Comp. Examp. 4 | Polyamide 6, 45 | CF6S 8.5 | Bondine ® AX8060 45 | MgCO$_3$ 1.0 | HMDAC 0.5 | 4 | 3600 | 300 | 280 | 64 |
| Comp. Examp. 5 | Polyamide 6, 45 | — | Bondine ® AX8060 45 | Mg$_3$(PO$_4$)$_2$ 1.0 | HMDAC 0.5 | 4 | 3500 | 290 | 240 | 61 |
| Comp. Examp. 6 | Polyamide 6, 45 | — | Bondine ® AX8060 45 | (C$_{17}$H$_{35}$COO)$_2$Mg 1.0 | HMDAC 0.5 | 6 | 3200 | 290 | 270 | 67 |
| Comp. Examp. 7 | Polyamide 6, 45 | — | Bondine ® AX8060 45 | Ca(OH)$_2$ 1.0 | HMDAC 0.5 | 5 | 3700 | 280 | 240 | 67 |
| Comp. Examp. 8 | Polyamide 6, 45 | — | Bondine ® AX8060 45 | CaCO$_3$ 1.0 | HMDAC 0.5 | 6 | 3500 | 270 | 230 | 66 |
| Comp. Examp. 9 | Polyamide 6, 45 | — | Bondine ® AX8060 45 | Al(OH)$_3$ 1.0 | HMDAC 0.5 | 5 | 3600 | 300 | 230 | 67 |

As stated above, the thermoplastic elastomer composition of the present invention can provide shaped articles having a well balance of various properties including mechanical properties and thermal properties and also having good appearance. Thus, it can be understood that this invention gives rise to markedly superior effects.

It can be said to be a quite unpredictable effect that by incorporation of magnesium hydroxide (C) or by incorporation of both magnesium hydroxide (C) and the with reference to specific embodiments thereof, it will be apparent to one skilled in the art that various changes and modifications can be made therein without departing from the spirit and scope thereof.

What is claimed is:

1. A thermoplastic elastomer composition having a flexural modulus as defined in JIS K7203-1982 of from 500 to 15,000 kg/cm$^2$, which is obtainable by melt kneading (A) from 20 to 60 parts by weight of a polyamide resin with (B) from 40 to 80 parts by weight of an ethylene copolymer comprising (a) from 40 to 90% by weight of an ethylene unit, (b) from 5 to 60% by weight of an $\alpha,\beta$-unsaturated carboxylic acid alkyl ester unit, and (c) from 0.3 to 10% by weight of a maleic anhydride unit, to obtain a composition (I), and further melt kneading 100 parts by weight of the composition (I) with (C) from 0.01 to 10 parts by weight of magnesium hydroxide having a specific surface area of no more than 20 $m^2/g$ as measured by the Brunauer-Emmett-Teller method.

2. A thermoplastic elastomer composition as claimed in claim 1, wherein said ethylene copolymer (B) comprises (a) from 65 to 90% by weight of an ethylene unit, (b) from 5 to 60% by weight of an $\alpha,\beta$-unsaturated carboxylic acid alkyl ester unit, and (c) from 1 to 5% by weight of a maleic anhydride unit.

3. A thermoplastic elastomer composition as claimed in claim 1, wherein said polyamide resin (A) is polyamide 6, polyamide 6.6, or polyamide 12.

4. A thermoplastic elastomer composition as claimed in claim 1, wherein said ethylene copolymer (B) has a melt index as defined in JIS K6760-1981 of from 0.1 to 200 g/10 min.

5. A thermoplastic elastomer composition as claimed in claim 1, wherein said $\alpha,\beta$-unsaturated carboxylic acid alkyl ester unit (b) is derived from methyl acrylate, ethyl acrylate, n-butyl acrylate, or methyl methacrylate.

6. A thermoplastic elastomer composition as claimed in claim 1, wherein said magnesium hydroxide (C) is used in an amount of from 0.05 to 5 parts by weight per 100 parts by weight of said composition (I).

7. A thermoplastic elastomer composition as claimed in claim 1, wherein said magnesium hydroxide (C) has a specific surface area of no more than 10 $m^2/g$ as measured by the Brunauer-Emmett-Teller method.

8. A thermoplastic elastomer composition having a flexural modulus as defined in JIS K7203-1982 of from 500 to 15,000 $kg/cm^2$, which is obtainable by melt kneading (A) from 20 to 60 parts by weight of a polyamide resin with (B) from 40 to 80 parts by weight of an ethylene copolymer comprising (a) from 40 to 90% by weight of an ethylene unit (b) from 5 to 60% by weight of an $\alpha,\beta$-unsaturated carboxylic acid alkyl ester unit, and (c) from 0.3 to 10% by weight of a maleic anhydride unit, to obtain a composition (I), and further melt kneading 100 parts by weight of the composition (I) with (C) from 0.01 to 10 parts by weight of magnesium hydroxide having a specific surface area of no more than 20 $m^2/g$ as measured by the Brunauer-Emmett-Teller method and (D) from 0.01 to 20 parts by weight of at least one compound containing two or more amino groups per molecule, which is selected from the group consisting of aliphatic polyamines, alicyclic polyamines, and aromatic amines.

9. A thermoplastic elastomer composition as claimed in claim 8, wherein said ethylene copolymer (B) comprises (a) from 65 to 90% by weight of an ethylene unit, (b) from 5 to 60% by weight of an $\alpha,\beta$-unsaturated carboxylic acid alkyl ester unit, and (c) from 1 to 5% by weight of a maleic anhydride unit.

10. A thermoplastic elastomer composition as claimed in claim 8, wherein said polyamide resin (A) is polyamide 6, polyamide 6.6, or polyamide 12.

11. A thermoplastic elastomer composition as claimed in claim 8, wherein said ethylene copolymer (B) has a melt index as defined in JIS K6760-1981 of from 0.1 to 200 g/10 min.

12. A thermoplastic elastomer composition as claimed in claim 8, wherein said $\alpha,\beta$-unsaturated carboxylic acid alkyl ester unit (b) is derived from methyl acrylate, ethyl acrylate, n-butyl acrylate, or methyl methacrylate.

13. A thermoplastic elastomer composition as claimed in claim 8, wherein said magnesium hydroxide (C) is used in an amount of from 0.05 to 5 parts by weight per 100 parts by weight of said composition (I).

14. A thermoplastic elastomer composition as claimed in claim 8, wherein said magnesium hydroxide (C) has a specific surface area of no more than 10 $m^2/g$ as measured by the Brunauer-Emmett-Teller method.

15. A thermoplastic elastomer composition as claimed in claim 8, wherein said amino group-containing compound (D) is used in an amount of from 0.05 to 5 parts by weight per 100 parts by weight of said composition (I).

16. A thermoplastic elastomer composition as claimed in claim 8, wherein the aliphatic polyamines are aliphatic polyamines having an aromatic ring or aliphatic diamines.

17. A thermoplastic elastomer composition as claimed in claim 16, wherein the aliphatic diamines are aliphatic diamine carbamates.

18. A thermoplastic elastomer composition as claimed in claim 17, wherein the aliphatic diamine carbamates are hexamethylenediamine carbamate.

19. A thermoplastic elastomer composition as claimed in claim 8, wherein the aliphatic polyamines are aliphatic polyamines having a tertiary amino group.

20. A thermoplastic elastomer composition as claimed in claim 8, wherein the alicyclic polyamines are alicyclic polyamines having a tertiary amino group.

21. A thermoplastic elastomer composition as claimed in claim 8, wherein the aromatic amines are aromatic amines having a tertiary amino group.

* * * * *